United States Patent [19]

Saito

[11] 4,229,238

[45] Oct. 21, 1980

[54] PROCESS FOR MANUFACTURING COAXIAL CABLE

[75] Inventor: Yasunori Saito, Yokohama, Japan

[73] Assignee: Sumitomo Electric Industries, Ltd., Osaka, Japan

[21] Appl. No.: 932,161

[22] Filed: Aug. 9, 1978

[30] Foreign Application Priority Data

Dec. 2, 1977 [JP] Japan ........................ 52-145536

[51] Int. Cl.[3] ........................ B29F 3/10

[52] U.S. Cl. ........................ 156/50; 156/53; 156/56; 264/103; 264/173; 264/174; 264/235; 264/346

[58] Field of Search ............... 264/174, 235, 103, 173, 264/346; 29/624, 627, 469.5; 156/47, 50, 53, 56

[56] References Cited

U.S. PATENT DOCUMENTS

| | | | |
|---|---|---|---|
| 3,461,499 | 8/1969 | Nevin et al. | 29/624 |
| 3,520,023 | 7/1970 | Verges et al. | 425/113 |
| 3,874,076 | 4/1975 | Tsukamoto et al. | 29/624 |
| 3,965,226 | 6/1976 | Werwitzke et al. | 264/235 |

*Primary Examiner*—Jeffery R. Thurlow
*Attorney, Agent, or Firm*—Sughrue, Rothwell, Mion, Zinn and Macpeak

[57] ABSTRACT

A process for manufacturing a coaxial cable which exhibits a substantially uniform electrostatic capacity with respect to length. The improvement includes the steps of reheating the insulated layer and then recooling and resolidifying the reheated insulated layer. The improvement also includes the steps of feeding and then reducing the outer diameter of the inner conductor prior to the winding of the rib onto the outer peripheral surface of the inner conductor.

1 Claim, 3 Drawing Figures

PROCESS FOR MANUFACTURING COAXIAL CABLE

BACKGROUND OF THE INVENTION

This invention relates to improvements in the manufacture of a coaxial cable in which a rib or tape of a synthetic resin is spirally wound on the outer peripheral surface of an inner conductor and then an outer sheath layer or tubular member made of a synthetic resin is extruded thereon so as to form an outer insulating layer or sheath which is integral with the inner conductor and the tape wound thereon.

FIG. 1 illustrates in cross-section a coaxial cable of an insulating sheath type. Reference numeral 1 designates an inner conductor made of a copper or aluminum tube or the like, and reference numeral 2 designates a synthetic resin rib or tape having a rectangular cross-section. Rib 2 is wound on the outer peripheral surface of inner conductor 1. Reference numeral 3 designates a tubular synthetic resin which is extruded around the rib 2 so as to be integral with the rib 2 along the length of the inner conductor 1. This construction produces an insulating layer which is composed of the tubular synthetic resin 3 and the synthetic resin rib or tape 2. Formed around the outer surface of the tubular synthetic resin 3 is an outer conductor 4 and a synthetic resin sheath 5.

A typical prior art process for manufacturing coaxial cables having the configuration described above includes the step of extruding a synthetic resin material 3 from an extruder around the outer peripheral surface of an inner conductor 1 having a synthetic rib or tape 2 spirally wound thereon, followed by the step of cooling and solidifying of the material 3 so as to form the insulating layer. However, in order to feed the unextruded inner conductor into an extruder, the extruded and cooled coaxial cable core is pulled by a drive means provided on the side of a take-up means.

The prior art process discussed above suffers from several major deficiencies. Because the coaxial cable core that is cooled and solidified is subjected to a tension by the drive means, a lack of uniformity results in the construction of the coaxial cable core. Furthermore, an uneven outer peripheral surface of the tubular layer or member having a spiral concave pattern occurs during the cooling and solidification of the insulating layer because the thermal contraction of the portions of the tubular layer which contact with the rib or tape is relatively larger than the thermal contraction of the non-contacting portions. As a result, the outer diameter of the tubular layer does not exhibit an uniformity along the length thereof. In other words, a spiral recessed portion is created along the spiral rib. The aforenoted deficiencies produce an increased variation in electrostatic capacity of a coaxial cable core the length thereof, which has a detrimental influence on the electrical characteristics of a coaxial cable.

SUMMARY OF THE INVENTION

It is an object of the present invention to eliminate or substantially reduce the aforenoted shortcomings by providing a process for manufacturing a coaxial cable having a coaxial cable core whose outer diameter is substantially constant or uniform along the length thereof.

According to the present invention, there is provided an improved process for manufacturing a coaxial cable having the improvement in the steps of feeding an inner conductor into an extruder by a delivery means which reduces the diameter of the inner conductor prior to the extrusion of the synthetic resin material, and reheating and then recooling and resolidifying the synthetic resin material after the steps of extruding and cooling and solidifying the synthetic resin material.

DETAILED DESCRIPTION OF THE INVENTION

Figure 1:
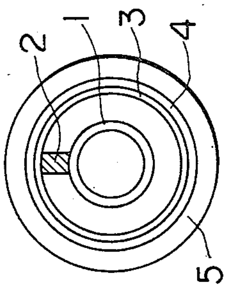
FIG. 1 is a cross-sectional view of a coaxial cable manufactured according to the process of the present invention.
Figure 2:
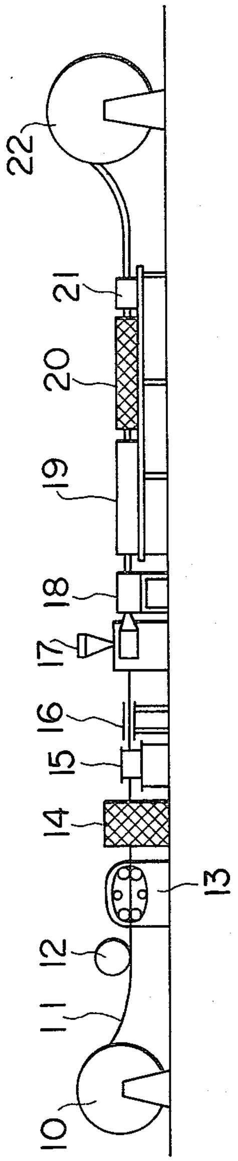
FIG. 2 is a view illustrative of the process of the present invention.

Referring now to the drawings and initially to FIG. 2, the steps of the process of the present invention for the manufacture of coaxial cable are now described in detail.

An inner conductor 11 is unwound under tension from a feeding means 10 via a gauge 12 by means of a delivery means 13, and is then fed to a reducing means 14, which reduces uniformly the outer diameter of inner conductor 11 by an amount of between 2% to 5%. The inner conductor 11 is then delivered via a cleaning means 15 and a conductor preheating means 16 to an extruder 17. A synthetic resin material is extruded from extruder 17 around the outer peripheral surface of the inner conductor 11 so as to form simultaneously an insulating layer having an outer tubular layer 3 and an inner spiral rib 2 integral therewith. Thereafter, the combination of the spiral rib 2 and tubular layer 3 in a semimolten state is fed to a sizing means 18. Sizing means 18 integrally molds the tubular outer layer 3 with the spiral rib or tape 2, and also sizes the outer surface of the tubular outer layer 3 to a preselected diameter value. The insulating layer (comprising rib or tape 2 and tubular outer layer 3) formed around inner conductor 11 is then cooled and solidified in a cooling means 19. Next, the insulating layer on inner conductor 11 is again heated in a heating means 20, after which the insulating layer on inner conductor 11 is again cooled and solidified in a means 21 and is then taken up by a take-up means 22.

As is apparent from the foregoing, the process according to the present invention produces a coaxial cable which exhibits improved electrical characteristics due to the process steps discussed in greater detail below.

The inner conductor 11 is unwound from the feeding means 10 by the tension provided thereto from delivery means 13. Next, the diameter of the inner conductor 11 is reduced uniformly by reducing means 14 so that any curl or kink in inner conductor 11 caused by feeding means 10 is eliminated. It should also be noted in this connection that the take-up means 22 does not apply any tension to inner conductor 11 and the associated insulating layer because all of the tension needed to move the coaxial cable core the process of the present invention is provided by delivery means 13 to the inner conductor 11. This contributes to the production of a coaxial cable core having a uniform outer diameter.

In the prior art process, after the insulating material has been extruded, it is cooled and solidified in a cooling means. This results in a spiral concave portion in the outer peripheral surface of the tubular outer layer being created along the spiral gap between adjacent ribs.

In contrast thereto, according to the present invention, the insulated layer is reheated by heating means 20, so that the shape of the insulated layer may be restored to the desired uniform shape, after which the insulated layer is again cooled and solidified by means 21. These additional steps result in a coaxial cable core having an outer diameter which is uniform along the length thereof.

As a result of the improved process steps discussed above, a coaxial cable can be produced by the process of the present invention having electrical characteristics which are substantially free of any variation in electrostatic capacity along the length thereof.

Figure 3:
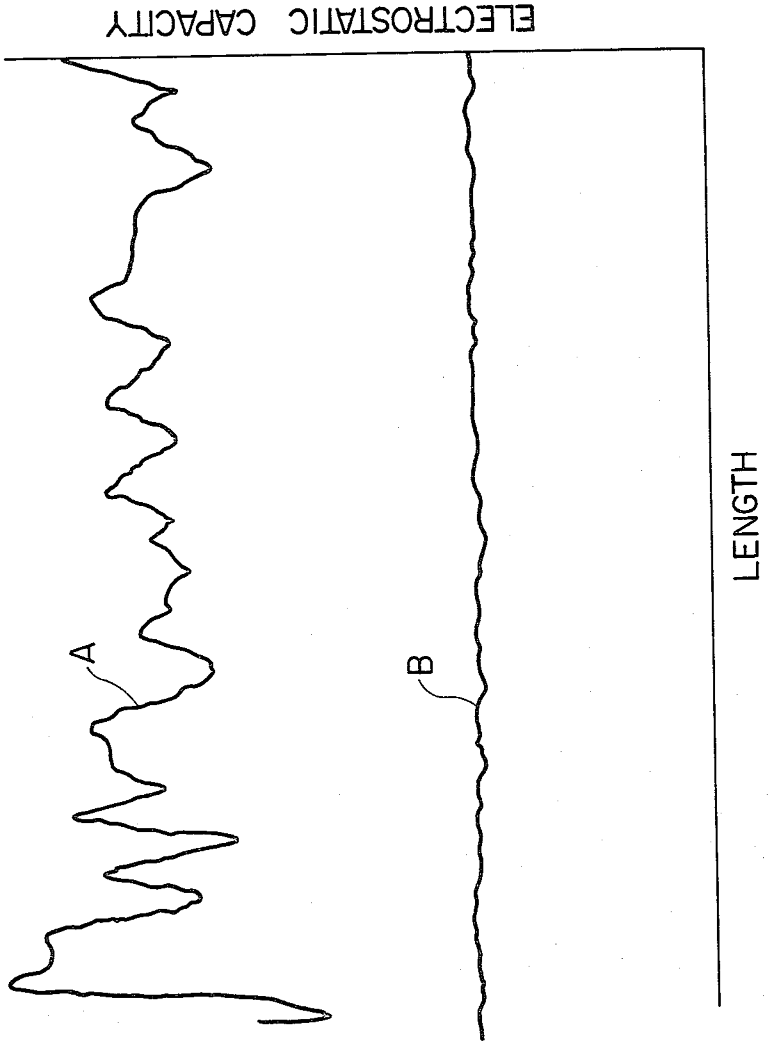
FIG. 3 is a graph which plots as trace A the electrostatic capacity with respect to length of a coaxial cable constructed in accordance with the prior art process, and which plots as trace B the electrostatic capacity with respect to length of a coaxial cable constructed in accordance with the process of the present invention.

The improved electrical characteristics are illustrated in FIG. 3, which plots as trace A the electrostatic capacity with respect to length of a coaxial cable constructed in accordance with the prior art process. Trace A shows a marked variation in electrostatic capacity with respect to length. The variation may be attributed to the residual curl in the inner conductor due to the feeding means, to the deformation of the inner conductor and an insulated member due to the tension applied thereto by the take-up means 22, and to the influence of a spiral concave portion formed in the outer peripheral surface of the tubular outer layer.

In contrast, trace B of FIG. 3 plots the electrostatic capacity with respect to length of a coaxial cable constructed in accordance with the process of the present invention. Trace B shows the substantially constant value in electrostatic capacity with respect to length of a coaxial cable constructed in accordance with the process of the present invention.

It has been found that the percentage of reduction in outer diameter of the inner conductor 11 produced by reducing means 14 should preferable be in the range between 2% and 5%. It has been found that when the reduction is less than 2%, the curl in the inner conductor present in the feeding means 10 cannot be sufficiently eliminated. On the other hand, in case the aforenoted reduction exceeds 5%, the driving torque required from delivery means 13 for feeding the inner conductor 11 is sharply increased.

What is claimed is:

1. In a process for manufacturing a coaxial cable core which includes the steps of winding a rib in a spiral fashion on the outer peripheral surface of an inner conductor along the length thereof, extruding a synthetic resin material onto the outer peripheral surface of said rib so as to form a tubular outer layer surrounding said inner conductor but in contact only with said rib, and cooling and solidifying said tubular outer layer so as to form an insulating layer, the improvement comprising the steps of:

(a) reheating said insulating layer until said insulating layer assumes a substantially uniform shape and recooling and resolidifying said reheated insulating layer;

(b) reducing the outer diameter of said inner conductor by an amount in the range of 2% to 5% of the original outer diameter prior to the step of winding the rib.

* * * * *